United States Patent [19]

Chiu et al.

[11] Patent Number: 5,500,888
[45] Date of Patent: Mar. 19, 1996

[54] CORDLESS TELEPHONE SECURITY CODE INITIATION AND PREVENTION SYSTEM

[75] Inventors: Wai T. Chiu; Kwong Y. Wong, both of Kowloon, Hong Kong

[73] Assignee: National Semiconductor Corporation, Santa Clara, Calif.

[21] Appl. No.: 328,610

[22] Filed: Oct. 25, 1994

Related U.S. Application Data

[63] Continuation of Ser. No. 64,372, May 19, 1993, abandoned, which is a continuation of Ser. No. 664,774, Mar. 5, 1991, abandoned.

[51] Int. Cl.$^6$ ..................................................... H04Q 7/38
[52] U.S. Cl. ................................ 379/61; 379/62; 455/88; 380/23
[58] Field of Search ................................ 379/61, 60, 62, 379/63; 375/205; 371/42; 380/9, 23; 455/88

[56] References Cited

U.S. PATENT DOCUMENTS

| | | | |
|---|---|---|---|
| 4,411,017 | 10/1983 | Talbot | 455/26 |
| 4,467,140 | 8/1984 | Fathauer et al. | 379/61 |
| 4,593,155 | 6/1986 | Hawkins | 379/61 |
| 4,639,549 | 1/1987 | Hirayama et al. | 379/62 |
| 4,639,550 | 1/1987 | Yamagawa et al. | 379/62 |
| 4,706,274 | 11/1987 | Baker et al. | 379/61 |
| 4,731,813 | 3/1988 | Schroeder | 379/61 |
| 4,731,814 | 3/1988 | Becker et al. | 379/61 |
| 4,794,636 | 12/1988 | Sanglier et al. | 379/62 |
| 4,979,205 | 12/1990 | Haraguchi et al. | 379/61 |
| 4,982,401 | 1/1991 | Box | 379/62 |
| 5,020,094 | 5/1991 | Rash et al. | 379/62 |
| 5,068,889 | 11/1991 | Yamashita | 379/62 |
| 5,097,500 | 3/1992 | Itoh | 379/62 |
| 5,109,537 | 4/1992 | Tolci | 455/88 |
| 5,157,710 | 10/1992 | Itoh | 379/62 |
| 5,243,641 | 9/1993 | Evans et al. | 379/61 |
| 5,282,250 | 1/1994 | Dent et al. | 380/23 |
| 5,288,978 | 2/1994 | Iijima | 235/380 |
| 5,301,234 | 4/1994 | Mazziotto et al. | 380/23 |

FOREIGN PATENT DOCUMENTS

| | | | |
|---|---|---|---|
| 0196834 | 10/1986 | European Pat. Off. | |
| 2154395 | 9/1985 | United Kingdom . | |
| 2176974 | 1/1987 | United Kingdom | 379/62 |
| 2217151 | 10/1989 | United Kingdom . | |
| 8502738 | 6/1985 | WIPO . | |

OTHER PUBLICATIONS

Popular Electronics, "Private First-Class Communications" p. 8, 1992, Jul.
Sokolowski, "Build a Cordless-Telephone Lock" Popular Electronics, Jul. 1992, p. 44.

*Primary Examiner*—Curtis Kuntz
*Assistant Examiner*—William Cumming
*Attorney, Agent, or Firm*—Steven F. Caserza; Flehr, Hohbach, Test, Albritton & Herbert

[57] ABSTRACT

A method and structure for increasing the security of a cordless telephone system by automatically altering the security code information stored in the cordless telephone handset and base unit. Thus, without requiring effort on the part of the user, the security codes are updated to differ from the previous security code setting, while always maintaining corresponding security codes in the handset and base unit. In one embodiment, the updating of the security code is performed at any convenient time interval or in response to any convenient activity, such as the placement of the handset into the base unit for storage and recharging. In one embodiment when the security code is to be updated a new security code is generated in a predetermined manner, for example by random number generation, by the handset. This information, together with information indicating that the security code is to be updated, is sent from the handset to the base unit, for example to the RF link normally used for wireless communication between the handset and the base unit.

18 Claims, 5 Drawing Sheets

CORDLESS TELEPHONE SECURITY CODE INITIATION AND PREVENTION SYSTEM

This application is a continuation U.S. Application Serial No. 08/064,372, filed May 19, 1993, now abandoned, which in turn is a continuation of U.S. Application Serial No. 07/664,774, filed Mar. 5, 1991, which is now abandoned.

INTRODUCTION

This invention pertains to communications, and particularly to portable communication systems such as a hand held telephone which includes a base unit and a handset.

BACKGROUND OF THE INVENTION

Since their introduction, hand held or "cordless" telephones have enjoyed a substantial popularity. Such telephones include a hand held unit or "handset" which looks much like a telephone but includes means for establishing a duplex radio link over a channel having two frequencies with a base unit which is hard wired to the telephone line. In use, communication is established between the base unit and the handset either upon initiation of a call by the handset user, or an incoming telephone call received over the telephone line. To the user, the handset must function as much as a standard telephone as possible, while providing mobility. The handset typically includes rechargeable batteries such as nicads which are recharged by placing the handset in the base unit for convenient storage and electrical connection to a battery charging power supply.

Given the fixed amount of radio spectrum, only a relatively small portion has been allocated to cordless telephones. Since cordless telephones are to a large degree unregulated and, unlike mobile phones or cellular telephones significantly less sophisticated, they inherently have certain limitations. Cordless telephones operate on a selected band of a relatively few channels. The selection is made somewhat permanently, i.e., by hardwiring or by the setting of a switch which may or may not be readily accessible by the user. Typically, the base unit and the handset are set to the same channel once and the channel setting is not changed thereafter. In fact, it is likely that few end users are actually aware of the ability to change channels in those cordless telephones which have this capability.

Regardless of whether a given cordless telephone has the ability to select one of a plurality of channels for use, the likelihood is high that a particular location may be undesirably within the communication range of more than one cordless telephone user on the same channel. Given the relative density of urban and suburban areas, and the desirability of having a cordless phone with sufficient communication range to allow its use within a reasonable proximity of a dwelling, a number of cordless telephone users in a given neighborhood may find themselves causing radio frequency interference with their neighbor's cordless telephones. Given also the relatively small number of channels used for cordless telephones, it is also relatively simple for a person to select a channel on his cordless telephone which is the same as the channel of another user. While this may allow an interloper to eave drop on another's conversation, perhaps more dangerous is the potential for the interloper to gain access to a neighbor's telephone line, allowing the interloper to answer or place calls on the neighbor's telephone line.

For these reasons, it is common to employ a security code in cordless telephone systems. Thus, in addition to selecting one of a relatively small number of channels, a cordless telephone user is able to establish a security code, much like a security code is established by persons utilizing remote control garage door openers on a common frequency. A simple security code in the prior art is the sub-audible tone which is encoded by a transmitter and detected by a receiver. If the appropriate one of the standard sub-audible tones is detected, communication is established. If not, communication is not established. A sub-audible tone is lower in frequency than tones which can be heard by the user, so there is no annoying sound heard by the user when the sub-audible tone is used.

A more sophisticated security system utilizes an N bit digital word which is typically transmitted at the beginning of the use of the cordless phone. Utilizing an N bit security code, 2N possible security codes are provided. The security code can either be factory preset so that the cordless handset and base unit include identical security codes, or may be set by the user, for example via DIP switches located on the handset and the base unit. This technique guards, at least to a certain extent, against the possibility of unintentional or unauthorized access to a user's telephone line.

U.S. Pat. No. 4,593,155 describes a cordless telephone system in which the handset is capable of learning the preset security code stored in its associated base unit. U.S. Pat. No. 4,731,813 describes such a cordless telephone system in which communication between the base unit and the handset of the security code information is accomplished by modulating the charging current supplied to the handset from the base unit.

A disadvantage of prior art security systems are that there are a relatively small number of sub-audible tones which can be sequentially tested by a would be intruder. Similarly, while there may be a greater number of digital security codes available, depending upon the number of bits N in the security word, given enough time and patience, a would-be intruder can determine the security code of a neighbor's cordless telephone system merely by trial and error.

Accordingly, there remains the need for providing greater security against would be intruders in cordless telephone systems.

SUMMARY OF THE INVENTION

According to the teachings of this invention, a novel method and structure are provided for increasing the security of a cordless telephone system. Means are provided for automatically altering the security code information stored in the cordless telephone handset and base unit. Thus, without requiring effort on the part of the user, the security codes are updated to differ from the previous security code setting, while always maintaining corresponding security codes in the handset and base unit.

In accordance with one embodiment of this invention, the updating of the security code is performed at any convenient time interval, or in response to any convenient activity. In one embodiment, such activity is the placement of the handset into the base unit for storage and recharging. Since this activity occurs quite frequently, the security code is updated quite frequently, significantly enhancing security provided to cordless telephones systems constructed in accordance with the teachings of this invention. By updating the security code when the handset is returned to the base unit, the security code is updated roughly in proportion to the amount of usage of the cordless telephone since, as usage increases, battery consumption increases, as is the number of times the handset is returned to the base unit for recharging.

In one embodiment of this invention, when the security code is to be updated a new security code is generated in a predetermined manner, for example by random number generation, by the handset. This information, together with information indicating that the security code is to be updated, is sent from the handset to the base unit, for example to the RF link normally used for wireless communication between the handset and the base unit.

DETAILED DESCRIPTION

Figure 1:
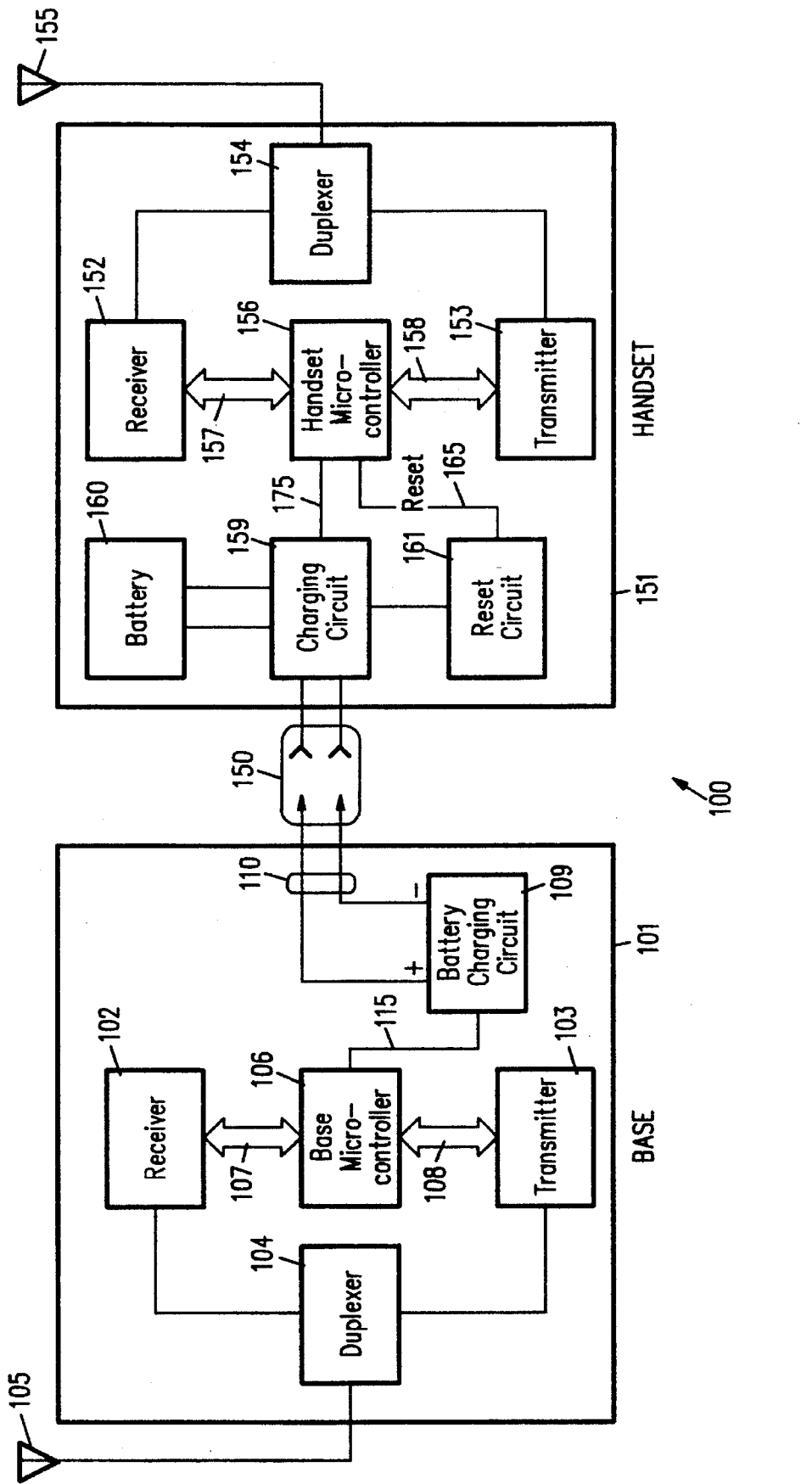
FIG. 1 is a block diagram depicting a cordless telephone system constructed in accordance with the teachings of this invention.

FIG. 1 is a block diagram depicting one embodiment of a cordless telephone system 100 constructed in accordance with the teachings of this invention. Cordless telephone system 100 includes base unit 101 and handset 151. A base unit 101 and handset 151 communicate control signals, security codes, and telephonic information via radio frequency (RF) utilizing antennas 105 and 155. The only electrical connection between base unit 101 and handset 151 is, if desired, a power connection made via connector 150, to allow base unit 101 to provide battery charging current to handset 151 when handset 151 is physically placed in a cradle within base unit 101.

Base unit 101 includes receiver 102 and transmitter 103, which are coupled on their RF side through duplexer 104 to antenna 105. This allows receiver 102 and transmitter 103 to operate on different frequencies utilizing a common antenna 105. Receiver 102 and transmitter 103 are controlled by base unit microcontroller 106 via busses 107 and 108, respectively. Base unit microcontroller 106 serves to monitor the telephone line which is connected to connector 112 and, via lead 111 to base microcontroller 106. When an incoming call is detected, base microcontroller 106 initiates communication handset 151 by providing control signals and security codes to transmitter 103. Similarly, base microcontroller 106 receives signals from receiver 102 which were transmitted by handset 151. By providing signals to transmitter 103 and receiving signals from receiver 102, base microcontroller 106 controls the operation of base unit 101 for incoming calls, and calls generated by handset 151.

Base unit 101 also includes battery charging circuit 109. Battery charging circuit 109 serves to provide the appropriate amount of voltage and current to handset 151 for recharging battery 160 when handset 151 is placed in base unit 101. Battery charging circuit 109 typically receives its power from either an AC source (not shown), or from a DC power supply (not shown) used to supply power to base unit 101, for example from an AC source. Battery charging circuit 109 provides battery charging current via leads 110 to connector 150. In accordance with the teachings of this invention, battery charging circuit 109 also includes lead 115 connected to base microcontroller 106. Lead 115 serves to provide a signal to base microcontroller 106 indicating that the handset is in the base cradle for charging.

Handset 151 includes receiver 152 tuned to the frequency of transmitter 103 of base unit 101. Handset 151 also includes transmitter 153 tuned to the frequency of receiver 102 of base unit 101. The RF side of receiver 152 and transmitter 153 are coupled through duplexer 154 to common antenna 155. Handset 151 includes handset microcontroller 156 which communicates control signals with receiver 152 via bus 157, and control signals with transmitter 153 via bus 158. Handset 151 also includes battery 160, such as a nicad battery, since handset 151 is intended for portable operation. Charging circuit 159 serves to charge battery 160 when handset 151 is placed in base unit 101 and thus charging circuit 159 is connected to battery charging circuit 109 via connector 150. In accordance with the teachings of this invention, reset circuit 161 is utilized in order to detect when handset 151 is placed in base unit 101. Circuit 161 provides a reset signal via reset lead 165 to handset microcontroller 156 when battery charging connection is made via connector 150.

Although not shown, handset 151 typically includes a microphone, speaker, and a keypad handset. Handset microcontroller 156 serves to evaluate signals received by receiver 152 and provide signals via transmitter 153 so that base unit 101 and handset 151 communicate with each other only when appropriate control signals are sent and the security code provided by base unit 101 matches the security code provided by handset 151.

Figure 2:
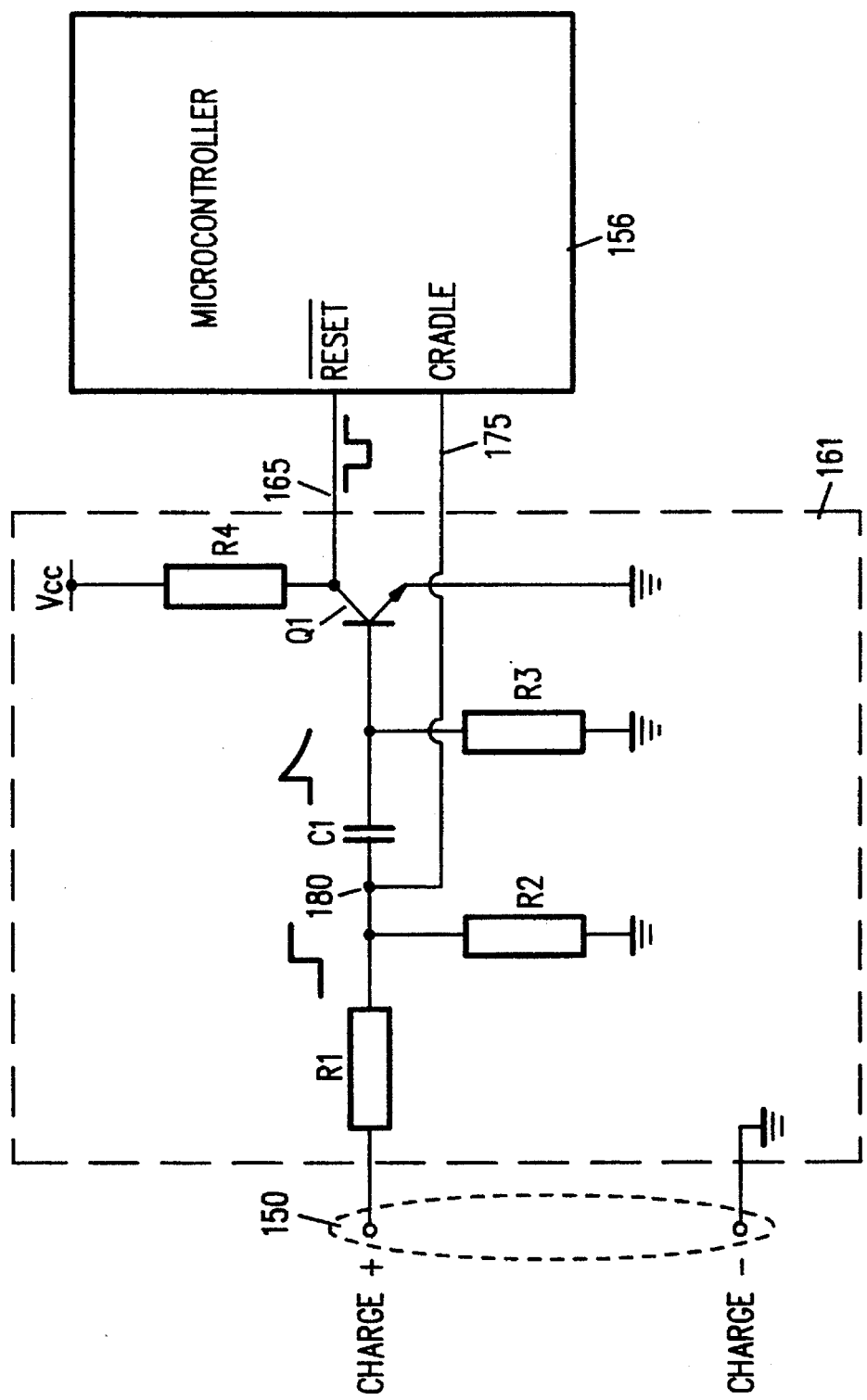
FIG. 2 is a diagram depicting an embodiment of a reset circuit of FIG. 1.

FIG. 2 is a schematic diagram depicting one embodiment of reset circuit 161 providing a reset signal via lead 165 to handset microcontroller 156. As shown in FIG. 2, reset circuit 161 includes resistor R1 connected to the handset side of battery charging connector 150. When handset 151 is placed in base unit 101 such that battery charging circuit 109 of base unit 101 is connected via connector 150 to handset 151, current will flow through resistors R1 and R2. This develops a voltage to turn on transistor Q1 as capacitor C1 charges. This causes a reset pulse to be generated on lead 165, which serves to reset the handset microcontroller, for example in the case of a "deadlock" of the handset microcontroller. This might occur, for example, when the handset battery is first charged as the supply voltage increases gradually and thus may not be able to generate a reset pulse to the handset microcontroller at powerup. The reset circuit shown on FIG. 2 also serves to filter a void reset signal bouncing which might otherwise occur when the handset is placed in the cradle of the base unit. When handset 151 is removed from base unit 101, capacitor C1 is discharged through resistors R2 and R3, allowing a reset signal to be generated when handset 151 is once again placed in base unit 101. Typical values for the components of reset circuit 161 of FIG. 2 are shown in the following table, and result in a reset pulse having a width of approximately 200 msec.

TABLE 1

| COMPONENT | VALUE |
|---|---|
| R1 | 47 k |
| R2 | 390 k |
| R3 | 390 k |
| R4 | 100 k |
| C1 | 1 µF |

Figure 3:
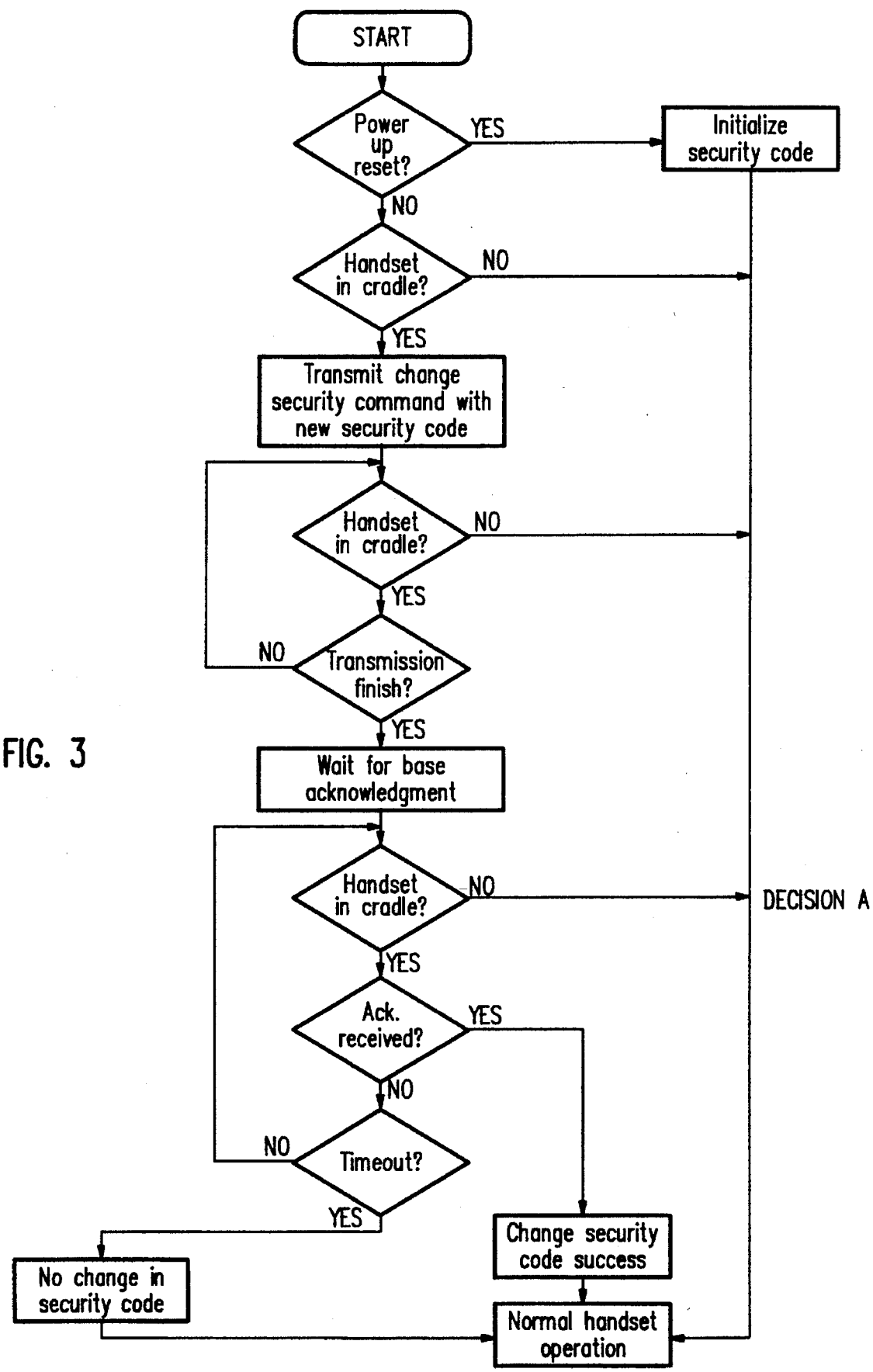
FIG. 3 is a flow chart depicting the operation of a cordless telephone handset constructed in accordance with the teachings of this invention.

FIG. 3 is a flow chart depicting the operation of one embodiment of a handset constructed in accordance with the teachings of this invention. When handset microcontroller 156 completes a reset operation, the operation of the flow chart of FIG. 3 is started. The handset microcontroller 156 first determines if the reset just completed was a power up reset which is performed, for example, when the battery is charged for the first time. If a powerup reset has just been performed, an initialize security code step is performed in order to set the same default value for the security code so that both handset and base unit have identical security codes and power up.

If the power up reset has not just been performed, the reset must have been a reset caused by placing handset 151 in base unit 101 and thereby causing reset circuit 151 to generate a reset signal on lead 165. In this event, it is determined whether the handset is still in the cradle of base unit 101. This is determined by, for example by the signal provided to handset microcontroller 156 from charging circuit 159 via lead 175, indicating that the handset is being recharged. If the handset is not still in the cradle, normal handset operation continues. However, if handset 151 remains in the cradle, handset 151 provides to base unit 101 a command indicating that the security code should be changed and a new security code word. This information is transmitted in any convenient fashion, preferably the RF link available between antennas 155 and 105. It is then determined whether handset 151 remains in the cradle. If not, the handset has been removed from the cradle before a security code update was completed. In this event, normal handset operation continues, and the security codeword is not updated. Conversely, if the handset remains in the cradle, it is determined whether the transmission of the command to update the security code has been completed. If not, a check is periodically made to determine whether the handset remains in the cradle. Once the transmission has finished, handset 151 waits for acknowledgement from base unit 101 of the command and the updated security code transmitted to base unit 101. Once this acknowledgement from base unit 101 is received, it is again determined whether handset 151 remains in the cradle of base unit 101. If not, it cannot be known with certainty whether the code update has been performed, and thus normal handset operation is continued and the security codeword is not updated. On the other hand, if handset 151 remains in the cradle, a determination is made as to whether the signal from the base indicates an acknowledgement that the security code has been updated. If yes, handset 151 changes its security code so that the security code stored by base 101 and handset 151 are both updated to the new security code previously selected by handset 151. Normal handset operation then continues with the updated security code.

Conversely, if handset 151 did not receive acknowledgement from base unit 101, a determination is made as to whether a predefined timeout period has expired. If timeout has occurred, there is no change in the security code in handset 151, and normal handset operation continues with the previous security code word. Conversely, if time out has not expired, the decision loop of determining whether the handset remains in the cradle, acknowledgment is received from the base unit, and time out has occurred, is repeated until an exit from this loop is made in one of the three manners just described.

The time delay between the moment handset 151 is placed in the cradle of base unit 101 and handset 151 transmits to base unit 101 a command indicating a security code should be updated is dependent on the width of the reset pulse generated by reset circuit 161, and any desired time delay provided by handset microcontroller 156, for example via well known programming techniques. In one embodiment of this invention, this time delay is approximately 600 msec seconds from the placement of handset 151 into the cradle of base unit 101.

In one embodiment of this invention, during the time in which handset 151 is awaiting acknowledgement from base unit 101, it is not necessary for handset 151 to remain in cradle of base unit 101 so long as good data transmission between the handset and the base unit is achieved so that the up-dating of the security code in both the handset and the base unit may be achieved. In this embodiment, decision step A is not utilized.

Figure 4:
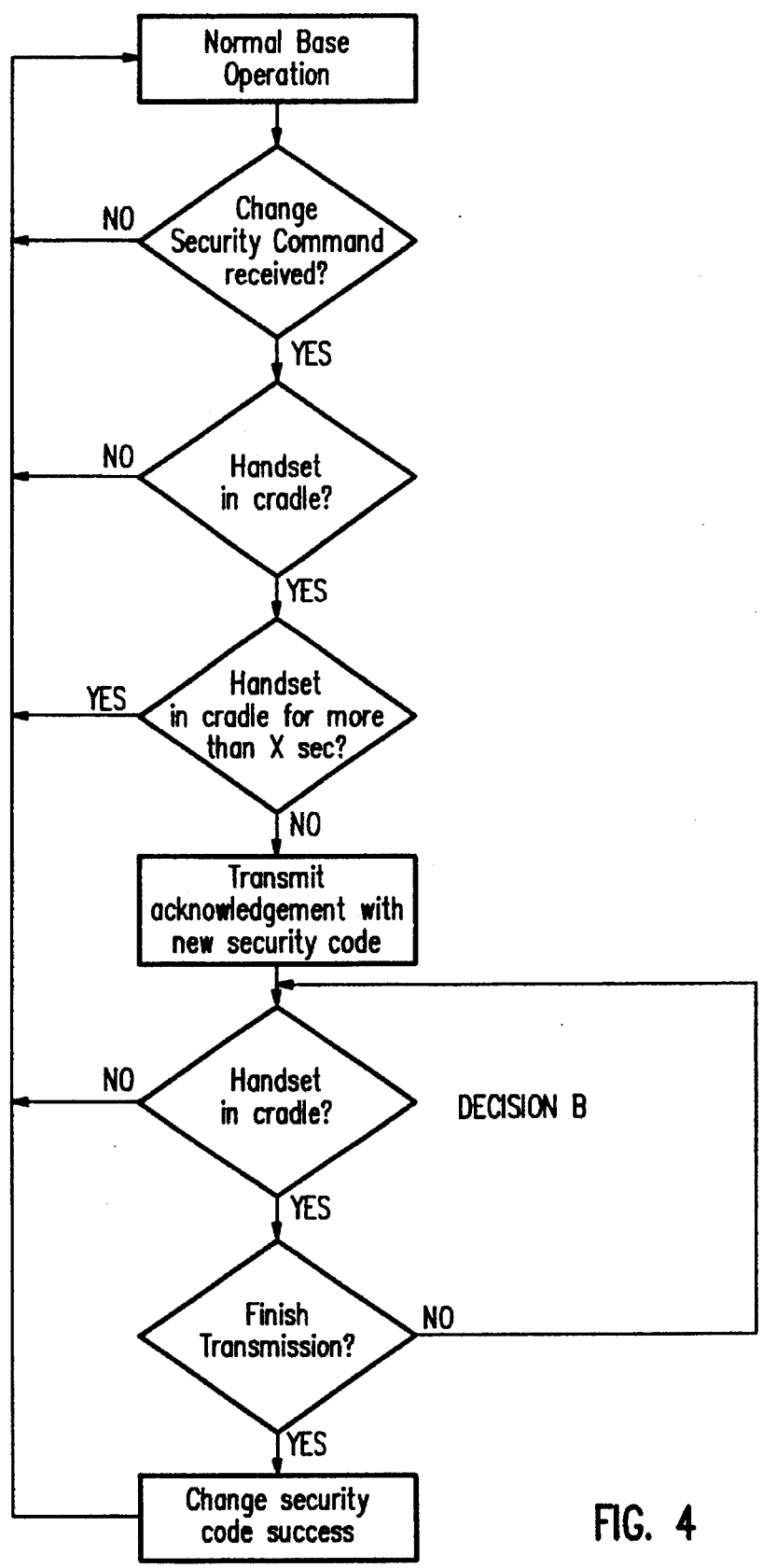
FIG. 4 is a flow chart depicting the operation of one embodiment of a cordless telephone and base unit constructed in accordance with the teachings of this invention.

FIG. 4 is a flow chart depicting the operation of one embodiment of a base unit 101 constructed in accordance with the teachings of this invention, particularly when utilized with a handset 151 which operates in accordance with the flow chart of FIG. 3. As shown in FIG. 4, normal base unit operation takes place until base unit 101 receives from handset 151 a command indicating that the security code word should be updated. Upon receipt of the command to update the security codeword, base unit 101 determines if handset 151 remains in the cradle, for example by a signal on the charge detect pin 175. If the handset is no longer in the cradle at this point of the flow chart, normal base operation continues utilizing the old security code word. Conversely, if the handset remains in the cradle, base unit 101 then determines if handset 151 remains in the cradle for more than a predetermined amount of time, for example X seconds typically on the order of one second or less. This is determined, for example, by $$X = T1 + N(T2+T3) + T4; \text{ where}$$

T1= the reset pulse width;

T2= to transmit a complete 'Change Security Code';

T3= time required to receive a complete 'Acknowledgement';

T4= tolerance; and

N= the number of trials to change security (N= 1 in FIGS. 3 and 4)

If no, base unit 101 transmits to handset 151 an acknowledgment with the new security codeword which it has received from handset 151. Base unit 101 then determines whether handset 151 remains in the cradle for a sufficient period of time for base unit 101 to complete its transmission to handset 151. If not, normal base unit operation, utilizing the previous security codeword, resumes. If yes, base unit 101 updates its security codeword prior to resuming normal base operation.

In one embodiment of this invention it is not necessary for handset 151 to remain in the cradle prior to the completion of the transmission by base unit 101 to handset 151. In this embodiment, decision B step is not implemented.

Figure 5:
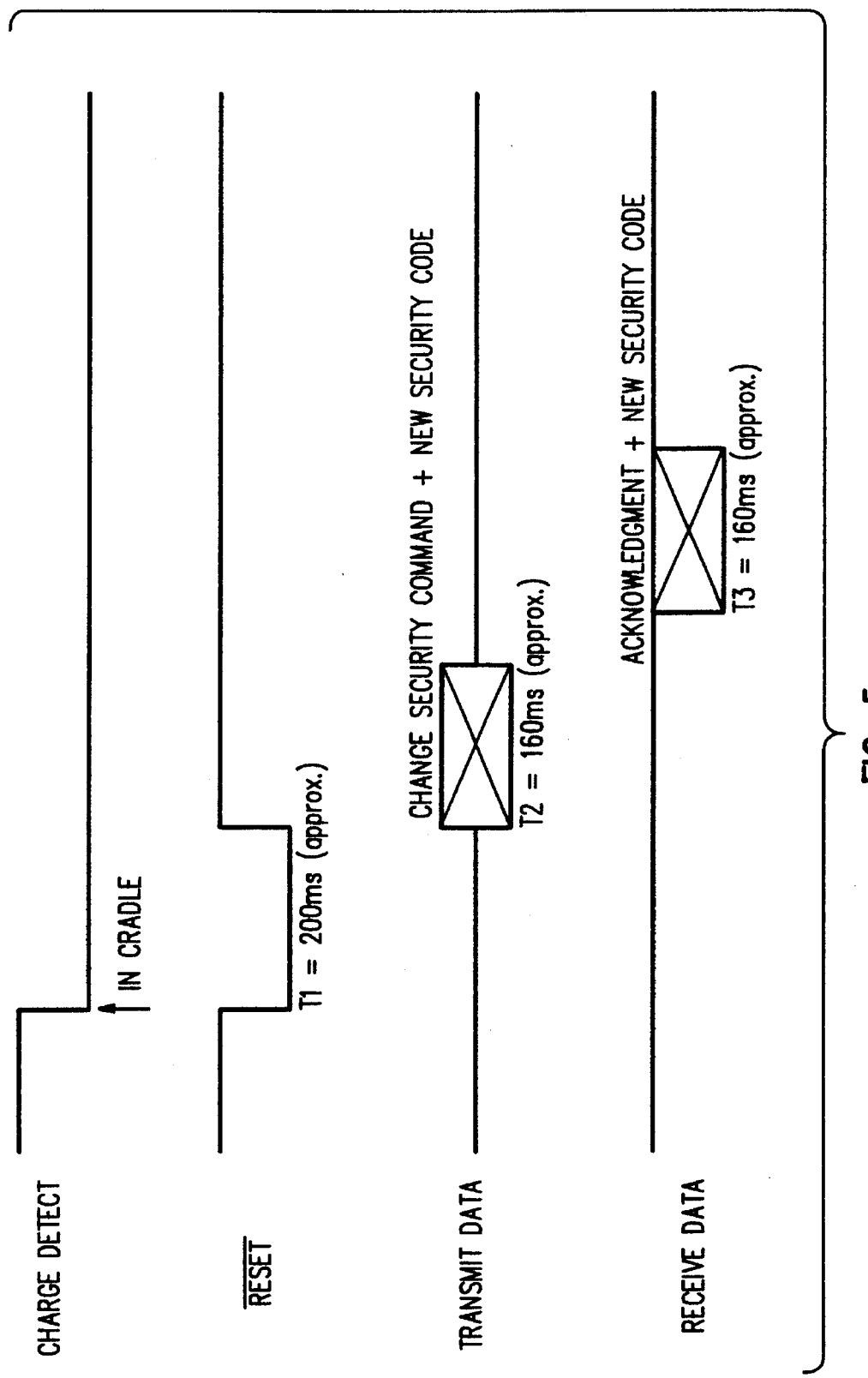
FIG. 5 is a timing diagram depicting the operation of one embodiment of this invention.

FIG. 5 is a timing chart depicting the operation of updating the security code word in the handset. As depicted in FIG. 5, when the handset is placed in the cradle, a charge detect signal is generated causing a $\overline{\text{RESET}}$ signal having a duration T1 of approximately 200 msec. At the end of the $\overline{\text{RESET}}$ pulse, data is transmitted from the handset to the base unit, during time period T2 of approximately 100 msec, for example. Following the transmitted data, data is received from the base unit during time period T3 of approximately 160 msec. Assuming the entire operation depicted in the timing diagram of FIG. 5 is completed, the security setting in both the handset and the base unit is accomplished.

In accordance with the teachings of this invention, upon a predetermined event, for example the placement of the handset in the cradle of the base unit, an operation will be initiated to update the security code in both the handset and the base unit. Alternatively, other events can be utilized in order to cause a security code update, for example the expiration of a certain elapsed time period, the expiration of a certain amount of usage of the cordless telephone, the removal of the handset from the base cradle, upon completion of a telephone call or a series of telephone calls, upon the depressing of a certain key on the handset, and the like. A security code in both the handset and the base unit is updated substantially simultaneously, and only when communication regarding the security code update has been initiated and acknowledged by both the handset and the base unit. The updated security code is chosen in any convenient fashion, for example in a random or pseudo-random manor.

While the above describes one embodiment of this invention in which the handset initiates an update of the security code, it is readily apparent to those of ordinary skill in the art in light of the teachings of this specification that alternative embodiments include those in which the base unit initiates updating of security codes, sending command and new security code information to the handset, which then acknowledges its security code update to the base unit which then updates the base unit security code.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A cordless telephone having a base unit and a handset unit comprising:

a first one of said base and said handset units including a first storage location for storing a first security code;

a second one of said base and said handset units including a second storage location for storing a second security code;

authorization circuitry allowing communication between said first one of said base and said handset units and said second one of said base and said handset units when said first security code and said second security code are set to corresponding values;

a security code update signal including a change security code command and a new security code, said security code update signal transmitted by said first one of said base and said handset units to said second one of said base and said handset units in order to update said security codes in both said firsthand said second ones of said base and said handset units;

initiation means for initiating the transmission of said security code update signal, said initiation means responsive to one or more predetermined events including the expiration of a certain elapsed time period, the expiration of a certain amount of usage of said cordless phone, the completion of a call, and the depression of a certain key on said handset unit;

an update acknowledgment signal transmitted by said second one of said base and said handset units responsive to said security code update signal from said first one of said base and said handset units;

first prevention means for preventing the updating of said first security code in said first one of said base and said handset units with said new security code upon the removal of said handset unit from said base unit prior to the expiration of a first time out period; and second prevention means for preventing the updating of said second security code in said second one of said base and said handset units with said new security code upon the removal of said handset unit from said base unit prior to the expiration of a second time out period;

said first and second security codes updated in both said first and said second ones of said base and said handset units upon receipt of said update acknowledgment signal by said first one of said base and said handset units unless otherwise prevented by said first and second prevention means.

2. A cordless telephone as in claim 1 wherein said communication between said first and said second ones of said base and said handset units in order to update said first and second security codes is conducted via an RF link between said first and said second ones of said base and handset units wherein, said RF link is also used for cordless telephonic communication between said first and said second ones of said base and said handset units.

3. A cordless telephone as in claim 1 wherein said base unit further comprises a cradle for holding said handset unit, and said communication between said first and said second ones of said base and said handset units in order to update said first and said second security codes is conducted via a direct link established between said handset and said base units when said handset unit is placed in said cradle.

4. A cordless telephone as in claim 3 wherein said direct link is established utilizing the charging current supplied by said base unit to said handset unit.

5. A cordless telephone as in claim 1 further comprising telephone operation detection circuitry that interrupts security code updates when normal cordless telephone communication between said base unit and said handset unit is anticipated.

6. A cordless telephone as in claim 5 wherein said telephone operation detection circuitry comprises a charge detect pin that detects the removal of said handset unit from said base unit.

7. The cordless telephone as in claim 1 wherein said first time out period expires a predetermined time after said security code update signal is transmitted to said second one of said base and said handset units.

8. The cordless telephone as in claim 1 wherein said second time out period expires a predetermined time after said update acknowledgment signal transmission is transmitted to said first one of said base and said handset units.

9. A cordless telephone having a base unit and a handset unit comprising:

a first one of said base and said handset units including a first storage location for storing a first security code;

a second one of said base and said handset units including a second storage location for storing a second security code;

authorization circuitry allowing communication between said first one of said base and said handset units and said second one of said base and said handset units when said first security code and said second security code are set to corresponding values;

a security code update signal including a change security code command and a new security code, said security code update signal transmitted by said first one of said base and said handset units to said second one of said base and said handset units in order to update said security codes in both said first and said second ones of said base and said handset units;

initiation means for initiating the transmission of said security code update signal, said initiation means responsive to one or more predetermined events including the expiration of a certain elapsed time period, the expiration of a certain amount of usage of said cordless phone, the completion of a call, and the depression of a certain key on said handset unit;

an update acknowledgment signal transmitted by said second one of said base and said handset units responsive to said security code update signal from said first one of said base and said handset units; and prevention means for preventing the updating of said first and said second security codes with said new security code, said prevention means disabling the updating of said security code upon the removal of said handset unit from said base unit prior to the expiration of a first timeout period;

said first and second security codes updated in both said first and said second ones of said base and said handset units upon receipt of said update acknowledgment signal by said first one of said base and said handset units conditioned upon the non-intervention of said prevention means.

10. The cordless telephone of claim 9 wherein the removal of said handset unit from said base unit includes a physical handset removal coupled with poor data transmission between the now separated base and handset units, such that said prevention means only prevents the updating of said first and second security codes after said handset unit is removed from said base unit when said poor data transmission is also present.

11. A cordless telephone having a base unit and a handset unit comprising:

a first one of said base unit and said handset units having a first security code;

a second one of said base unit and said handset units having a second security code;

a security code update signal including a change security code command and a new security code, said security code update signal transmitted by said first one of said base and said handset units to said second one of said base and said handset units in order to update said security codes in both said first and said second ones of said base and said handset units;

initiation means initiating the transmission of said security code update signal, said initiation means responsive to one or more events including the expiration of a predetermined elapsed time period, the expiration of a predetermined amount of usage of said cordless telephone, the completion of a call and the depression of a handset key;

an update acknowledgment signal transmitted by said second one of said base and said handset units responsive to said security code update signal from said first one of said base and said handset units; and prevention means for preventing the updating of said security code in said first and said second ones of said base and said handset units with said new security code, said prevention means including a stimulus for disabling the updating of said security code selected from the group consisting of: the expiration of more than a predetermined amount of time and a handset removal signal;

said first and second security codes updated in both said first and said second ones of said base and said handset units upon receipt of said update acknowledgment signal by said first one of said base and said handset units conditioned upon the nonintervention of said prevention means.

12. The cordless telephone of claim 11 wherein the removal of said handset unit from said base unit includes a physical handset removal coupled with poor data transmission between the now separated base and handset units, such that said prevention means only prevents the updating of said first and second security codes after said handset unit is removed from said base unit when said poor data transmission is also present.

13. A method for operating a cordless telephone including a handset unit and a base unit each storing a security code, said method comprising the steps of:

initiating the updating of said security code in said base and said handset units, said initiation step executed upon the occurrence of one or more events including the expiration of a predetermined amount of time, the expiration of a predetermined amount of usage of said cordless telephone, the completion of a call, and the depression of a handset key;

generating a security code update signal including a change security code command and a new security code;

transmitting said security code update signal from a first one of said base and said handset units to a second one of said base and said handset units in order to update said security codes in both said first and said second ones of said base and said handset units;

transmitting an update acknowledgment signal responsive to said security code update signal back to said first one of said base and said handset units;

continuing normal operation in said first one of said base and said handset units and not updating said security code in said first one of said base and said handset units upon non-receipt of said update acknowledqment signal and the expiration of a first time out period;

continuing normal operation in said second one of said base and said handset units and not updating said security code in said second one of said base and said handset units upon the removal of said handset unit from said base unit prior to the expiration of a second time out period; and updating said security code with said new security code in said first and said second ones of said base and said handset units upon receipt by said first one of said base and handset units of said update acknowledgment signal.

14. The method as in claim 13 wherein said first time out period expires a predetermined time after said security code update signal is transmitted to said second one of said base and said handset units.

15. The method as in claim 13 wherein said second time out period expires a predetermined time after said update acknowledgment signal is transmitted to said first one of said base and said handset units.

16. The method of claim 13 further including the step of:

upon receipt of a handset removal signal prior to the acknowledgment of said security code update signal, evaluating the data transmission between said handset and said base units when said handset unit is removed from said base unit, said updating step only performed when good data transmission between the base and handset units is achieved to allow for the updating of said security codes.

17. A cordless telephone having a base unit and a handset unit comprising:

a first one of said base and said handset units including a first storage location for storing a first security code;

a second one of said base and said handset units including a second storage location for storing a second security code;

authorization circuitry allowing communication between said first one of said base and said handset units and said second one of said base and said handset units when said first security code and said second security code are set to corresponding values;

a security code update signal including a change security code command and a new security code, said security code update signal transmitted by said first one of said base and said handset units to said second one of said base and said handset units in order to update said security codes in both said first and said second ones of said base and said handset units;

means for initiating the transmission of said security code update signal, said initiating means responsive to one or more events including elapsed time, handset removal, usage, call completion depression of a handset key;

an update acknowledgment signal transmitted by said second one of said base and said handset units responsive to said security code update signal from said first one of said base and said handset units; and means for preventing the updating of said first and said second security codes with said new security code, said prevention means disabling the updating of said security code upon the non-receipt of said acknowledqment signal and the expiration of a first timeout period;

said first and second security codes updated in both said first and said second ones of said base and said handset units upon receipt of said update acknowledgment signal by said first one of said base and said handset units conditioned upon the non-intervention of said prevention means.

18. A method for operating a cordless telephone including a handset unit and a base unit each storing a security code, said method comprising the steps of:

initiating the updating of said security code in said base and said handset units, said initiation step executed conditioned on the occurrence of a predetermined event, said predetermined event selected from the group comprising the expiration of an elapsed time period, handset removal, usage of said cordless telephone, call completion and the depression of a handset key;

generating said security code update signal including a change security code command and a new security code;

transmitting said security code update signal from a first one of said base and said handset units to a second one of said base and said handset units in order to update said security codes in both said first and said second ones of said base and said handset units;

transmitting an update acknowledgment signal responsive to said security code update signal back to said first one of said base and said handset units;

continuing normal operation in said first one of said base and said handset units, not updating said security code, and making use of an existing security code in said first one of said base and said handset units upon the non-receipt of said update acknowledgment signal and the expiration of a first time out period; and updating said security code with said new security code in said first and said second ones of said base and said handset units upon the receipt of the update acknowledgment signal by said first one of said base and handset units.

* * * * *